United States Patent
Cuomo et al.

(10) Patent No.: US 7,334,087 B2
(45) Date of Patent: Feb. 19, 2008

(54) CONTEXT-SENSITIVE CACHING

(75) Inventors: Gennaro A. Cuomo, Apex, NC (US); Brian Keith Martin, Cary, NC (US); Donald F. Ferguson, Yorktown Heights, NY (US); Daniel C. Shupp, Raleigh, NC (US); Goran D. Zlokapa, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/053,106

(22) Filed: Feb. 8, 2005

(65) Prior Publication Data

US 2005/0160224 A1 Jul. 21, 2005

Related U.S. Application Data

(62) Division of application No. 10/026,388, filed on Dec. 21, 2001, now Pat. No. 6,886,077.

(51) Int. Cl.
*G06F 12/02* (2006.01)
(52) U.S. Cl. .................................................. 711/129
(58) Field of Classification Search ................ 711/118, 711/119, 129
See application file for complete search history.

(56) References Cited

OTHER PUBLICATIONS

IBM, "IBM WebSphere Application Server Version 3.5 Release Notes", http://www-3.ibm.com/software/webservers/appserv/doc/v35/ae/infocenter/was/relnotes.html, Aug. 8, 2000, p. 98-110, sections 6.6.0.4.1 to 6.6.0.4.1.4.*

* cited by examiner

*Primary Examiner*—Kevin L. Ellis
(74) *Attorney, Agent, or Firm*—A. Bruce Clay, Esq.; Steven M. Greenberg, Esq.; Carey Rodriguez Greenberg & Paul LLP

(57) ABSTRACT

A method of caching contextually variant objects in a common cache. The method can include identifying an object type for a requested object and determining whether the requested object has an object type which is specified among an enumerated set of cacheable object types which can be stored in the common cache. Importantly, each cacheable object type can have an associated context. If the requested object has an object type which is specified among the enumerated set of cacheable object types, a cache key can be computed for the requested object using cache key formulation rules for the associated context. Finally, the requested object can be retrieved from the common cache using the formulated cache key. Notably, in one aspect of the invention, the method also can include the step of invalidating individual objects in the common cache according to corresponding cache policies of associated contexts.

10 Claims, 2 Drawing Sheets

CONTEXT-SENSITIVE CACHING

CROSS-REFERENCE TO RELATED APPLICATIONS

This patent application claims the benefit under 35 U.S.C. §121 as a divisional of co-pending U.S. patent application Ser. No. 10/026,388, entitled "CONTEXT-SENSITIVE CACHING" filed on Dec. 21, 2001, incorporated herein by reference.

BACKGROUND OF THE INVENTION

1. Statement of the Technical Field

The present invention relates to the field of data caching and more particularly to caching contextually variant objects in a distributed computing system.

2. Description of the Related Art

Caching is the temporary storage of objects for subsequent retrieval. Caching objects over a network can provide several performance advantages. For instance, caching can reduce network bandwidth consumption in consequence of fewer requests and responses transmitted over the network. Caching also can reduce server load as a result of handling fewer requests. Finally, caching can reduce response latency as responses for cached requests are available immediately, and are closer to the client being served. Together, these advantages can enhance the performance while reducing the cost of deploying applications.

Typically, caching can be performed in the client application. In that regard, caching functions are included as part of most commercially available Web browsers. Client side caches typically cache network objects obtained from many servers, but all for a single end-user. Caching, however, also can be performed in between the client and the server as part of a proxy. Proxy caches are often located near network gateways to reduce the bandwidth required over expensive dedicated network connections. Unlike the client-side cache, the proxy cache can serve many end-users with cached objects obtained from many servers. For even greater performance, many proxy caches are included as part of a cache hierarchy in which a cache can inquire of neighboring caches for a requested object in order to reduce the need to fetch the object directly.

In addition to client-side caching and proxy caching, caches also can be placed directly in front of a particular server in order to reduce the number of requests that the server must handle. Most proxy caches can be used in this fashion, but this form of a cache has been referred to otherwise as a "reverse cache", "inverse cache", or sometimes "httpd accelerator" in reference to the hypertext transfer protocol. In particular, the terms "reverse" and "inverse" refer to the fact that the cache stores objects for many clients, but the objects are obtained from a single server.

Though effective for many purposes, each of the client-side cache, proxy cache and reverse cache can be considered deficient in several ways. For instance, caches are specifically configured for particular contexts. Particularly, caches can be configured to cache many types of objects, including database objects, remote method calls, the results of expensive computations, Web pages, application components and images. Of course, depending upon the context, the caching rules specified in each "caching policy", particularly the cache key generation rules and cache entry invalidation rules, will vary. Furthermore, the manner in which cache entries are named also can vary according to the naming convention associated with each context. In consequence, to reconfigure the cache for operation in a different context, however, requires the redesign of the caching engine itself.

SUMMARY OF THE INVENTION

The present invention is a context-sensitive caching system and method which overcomes the deficiencies of the prior art by providing a configurable common cache for objects having multiple contexts, without requiring complex reprogramming typically associated with prior art caching schemes. In accordance with the present invention, a context-sensitive caching system can include a common cache, and a common caching engine configured to write cacheable objects to the common cache. The common caching engine can be further configured to retrieve cacheable objects stored in the cache.

A shared name generator can be provided which can be configured to formulate cache keys for locating the cacheable objects written to the common cache. Additionally, one or more configuration specifications can be provided, each configuration specification specifying a caching policy for a single context. Finally, one or more plugable context providers can be provided, each plugable context provider providing the common caching engine with an interface to context specific data and an interpretation of the caching policy of the configuration specification into concrete values. In particular, each plugable context provider can include an application configured to provide an interface to the caching policy, and a deployment descriptor through which the common caching engine can access the caching policy.

Notably, the caching policy can include a specified cacheable object type; rules for formulating cache keys for objects of the cacheable object type; and, rules for invalidating objects in the common cache of the cacheable object type. In that regard, the cache key formulation rules can include rules for formulating cache keys for individual objects of the cacheable object type; and, rules for formulating cache keys for groups of the individual objects of the cacheable object type. The cache key formulation rules also can include conditional formulation rules specified using logical operators.

A method of caching contextually variant objects in a common cache can include identifying an object type for a requested object and determining whether the requested object has an object type which is specified among an enumerated set of cacheable object types which can be stored in the common cache. Importantly, each cacheable object type can have an associated context. If the requested object has an object type which is specified among the enumerated set of cacheable object types, a cache key can be computed for the requested object using cache key formulation rules for the associated context. Finally, the requested object can be retrieved from the common cache using the formulated cache key. Notably, in one aspect of the invention, the method also can include the step of invalidating individual objects in the common cache according to corresponding cache policies of associated contexts.

The computing step can include computing an individual cache key for the requested object using the cache key formulation rules for the associated context. Also, one or more group cache keys can be computed for the requested object using the cache key formulation rules for the associated context. In this case, the group key can associate the requested object with other objects of the associated context which are stored in the common cache. Finally, the computing step can include evaluating logical expressions in the formulations rules for the associated context. The resulting evaluation can produce a particular formulation rule. As such, the cache key can be computed for the requested object using a cache key formulated using the particular formulation rule.

Thus, in accordance with the present invention, the common cache can be configured to cache many types of objects, including database objects, remote method calls, the results of expensive computations, Web pages, application components and images. In particular, the common cache can cache these contextually varying types of objects notwithstanding the varying cache key generation rules and cache entry invalidation rules of each object type. In consequence, to cache a new object type in the common cache, only the addition of a context provider and configuration specification can be required.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a context-sensitive caching system and method. In accordance with the inventive arrangements, the context-sensitive caching system can be configured generically to cache objects across multiple contexts, for instance Web pages, command execution results, database access results, application archives and audio-visual files. In particular, a common cache can be managed by a common caching engine configured to cache objects of varying contexts. Advantageously, the set of objects for which the common caching engine can be configured can vary according to a set of configuration specifications for each context. In consequence, the context-sensitive caching system can provide a common cache for objects across multiple contexts, without requiring complex reprogramming typically associated with prior art caching schemes. Furthermore, a shared cache namespace allows cache invalidations to occur across different application contexts.

Figure 1:
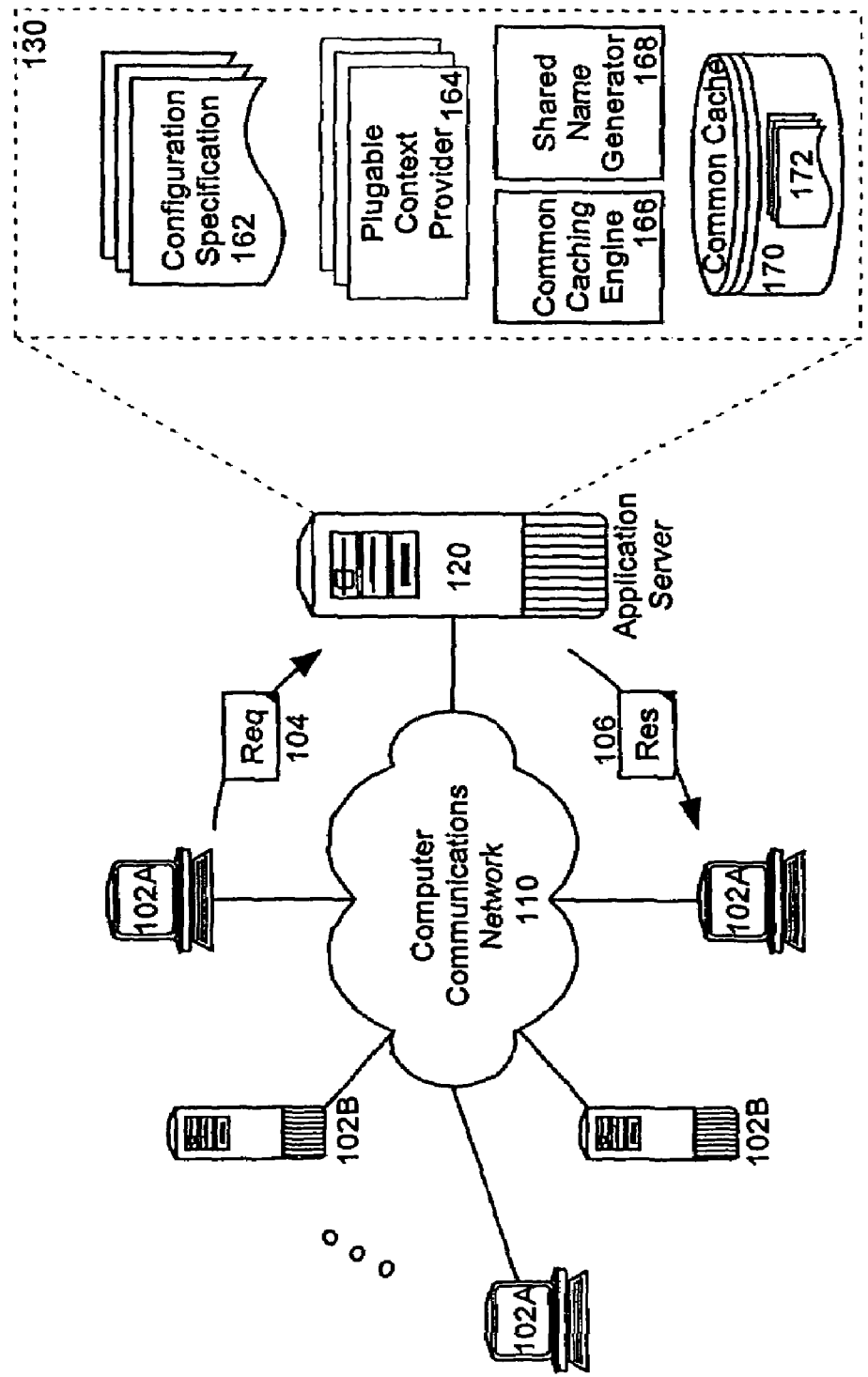
FIG. 1 is a schematic illustration of a preferred embodiment of the context-sensitive caching system of the present invention; and, FIG. 2 is a flow chart illustrating a process for caching context sensitive data in the context-sensitive caching system of FIG. 1.

FIG. 1 is a schematic illustration of a preferred embodiment of the context-sensitive caching system of the present invention. As shown in FIG. 1, the context-sensitive caching system 130 can include a common cache 170 storing cacheable objects 172. A common caching engine 166 further can be provided in addition to a shared name generator 168. The common caching engine 166 can identify cacheable objects 172 and can write those identified cacheable objects to the common cache 170 using a caching key generated by the shared name generator 168.

Notably, plugable context providers 164 can be communicatively linked to the common caching engine 166. Each plugable context provider 164 can provide an interface to a set of configuration specifications 162 for a particular context. Each configuration specification 162, in turn, can specify those cacheable objects 172 to cache within the context, the data associated with the cacheable objects 172 which can be used to create cache keys, and rules which are to be applied when determining whether to invalidate a cacheable object 172 within the context.

In one aspect of the present invention, each plugable context provider 164 can be an application exposed to the common caching engine 166 through deployment descriptors, as is well-known in the art. The plugable context provider 164, itself, can be configured to process a uniformly formatted configuration specification 162, for example using a markup language such as XML. Still, the invention is not limited in this regard and the plugable context provider 164 can be an application exposed to the common caching engine 166 through other machine readable techniques.

Importantly, each configuration specification 162 which can be accessed through a plugable context provider 164 can specify not only rules for generating cache keys, but also the configuration specification 162 can specify rules for generating group cache keys for entries in the common cache 170. In this regard, group cache keys can be used to associate a group of cache entities to a single cache key. Furthermore, the configuration specification can include logical operators including AND, OR and NOT operators, which can be used in specifying the formulation of individual and group cache keys. Advantageously, the plugable context provider 164, in conjunction with the shared name generator 168, can be configured to process the logical operators to produce the caching policy for the particular context with which the configuration specification 162 is associated.

In addition to the specification of cache key generation rules, the configuration specification 162 can include rules for invalidating cache entries, whether individually or in a group, whether explicitly or otherwise. In particular, the configuration specification can specify when the validity of a cache entry has expired, or become "stale", e.g. a time-to-live value. Also, the configuration specification can specify when a cache entry should be explicitly invalidated based upon an extrinsic event. Like the cache key generation rules, however, the plugable context provider 164 can be configured to process the invalidation rules set forth in the associated configuration specification 162.

In operation, client devices 102A and proxy servers 102B can be linked over computer communications network 110 to an application server 120 which hosts the context-sensitive cache 130. The application server 120 can be a conventional application server which, for example, can respond to network requests 104 to perform an application operation with network responses 106 containing the results of the requested operations. Alternatively, the application server 120 can be a database server configured to respond to database access requests with data stored therein. In any case, the application server 120 is not limited as such and can be any type of network server configured to respond to network requests 104.

The context-sensitive caching engine 130 can intercept network requests 104 to determine whether any cacheable objects 172 which are to be invoked, generated, retrieved or produced in consequence of the network requests 104 already reside in the common cache 170. If so, the pertinent cacheable objects 172 can be retrieved from the common cache 170 rather than requiring the application server 120 to process the network request 104. Notably, as one skilled in the art will recognize, the context-sensitive caching engine 130 is not limited strictly to caching whole portions of output produced by, or work to be performed within the application server 120. Rather, the context-sensitive caching engine 130 also can cache portions of the output or work as the case may be.

Importantly, though FIG. 1 illustrates the context-sensitive cache 130 as a reverse cache, the invention is not so limited. Rather, the context-sensitive cache 130 further can be deployed as a client-side cache or even a proxy cache. In that regard, like the reverse cache configuration illustrated in FIG. 1, in a client-side or proxy cache configuration, the context-sensitive cache of the present invention advantageously can provide a common cache for objects across multiple contexts, without requiring complex reprogramming typically associated with prior art client-side and proxy caching schemes.

Figure 2:
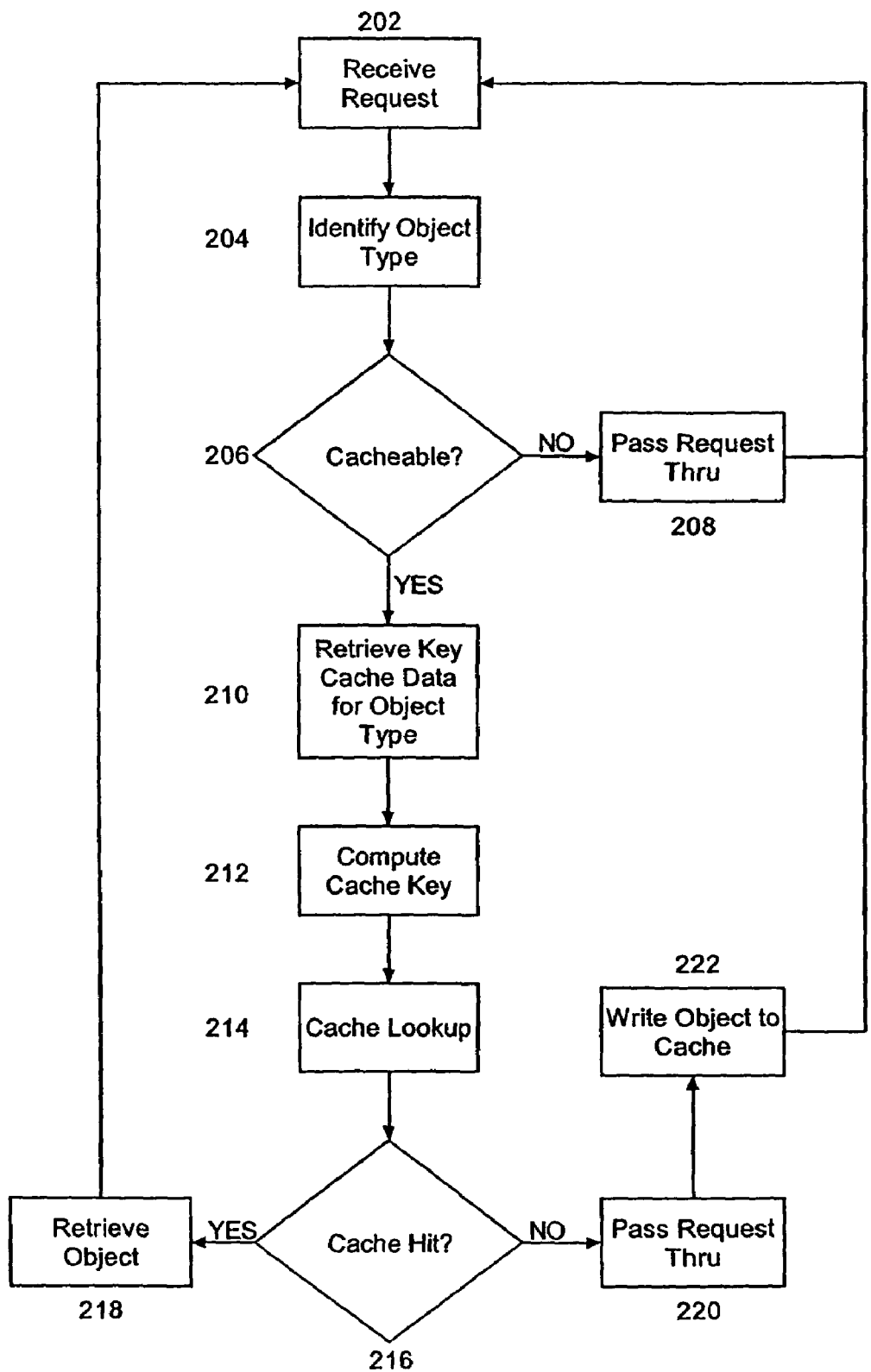

FIG. 2 is a flow chart illustrating a process for caching context-sensitive data in the context-sensitive caching system of FIG. 1. Beginning in block 202, the caching engine can receive a network request for an object. The request can be a request to retrieve an object, for example a Web page or an audio-visual file. Furthermore, the request can be a request for an associated application server to invoke the execution of an object, for example a method to retrieve results from a database and update the object's state. Finally, the request can be a request to invoke an application command.

In block 204, the common caching engine can identify the type of requested object to determine whether the requested object is cacheable. Notably, the common caching engine can determine whether the requested object is cacheable based upon the configuration of the common caching engine, as specified by one or more configuration specifications driving the common caching engine. In any case, if in decision block 206 it is determined that the requested object is not a cacheable object, in block 208 the request can be forwarded on to the specified server. Otherwise, the process can continue in block 210.

In block 210, the shared name generator can consult the configuration specification associated with the identified object type to determine what data in the object or other objects as provided by the plugable context provider can be used to formulate the caching key for the object. In block 212, the shared name generator can formulate the caching key based upon the determined data. Finally, in block 214 the common caching engine can attempt to locate a cached version of the requested object in the common cache using the caching key formulated by the shared name generator.

In block 216, if the requested object is located in the common cache, the located object 218 can be retrieved from the common cache and returned to the requester. Otherwise, in block 220, the network request can be forwarded to the specified server. Importantly, in block 222, once the specified server produces the requested object, the common caching engine can determine whether to write the requested object to the common cache. In particular, the common caching engine can consult the configuration specification associated with the identified object type to determine whether the caching policy requires that the common caching engine write the requested object to the common cache. In that case, the shared name generator once again can formulate a caching key to be used when writing the requested object to the common cache.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of caching contextually variant objects in a common cache comprising the steps of:

identifying an object type for a requested object;

determining whether said requested object has an object type which is specified among an enumerated set of cacheable object types which can be stored in the common cache, said cacheable object type having an associated context; and, upon said requested object having an object type which is specified among said enumerated set of cacheable object types, computing a cache key for said requested object using cache key formulation rules for said associated context, and retrieving said requested object from the common cache using said formulated cache key.

2. The method of claim 1, wherein said computing step comprises the step of computing an individual cache key for said requested object using said cache key formulation rules for said associated context.

3. The method of claim 2, wherein said computing step further comprises the step of computing a group cache key for said requested object using said cache key formulation rules for said associated context, said group key associating said requested object with other objects of said associated context which are stored in the common cache.

4. The method of claim 1, further comprising the step of invalidating individual objects in the common cache according to corresponding cache policies of associated contexts.

5. The method of claim 1, wherein said computing step comprises the steps of:

evaluating logical expressions in said formulations rules for said associated context, said evaluation producing a particular formulation rule; and, computing said cache key for said requested object using a cache key formulated using said particular formulation rule.

6. A machine readable storage having stored thereon a computer program for caching contextually variant objects in a common cache, the computer program comprising a routine set of instructions for causing the machine to perform the steps of:

identifying an object type for a requested object;

determining whether said requested object has an object type which is specified among an enumerated set of cacheable object types which can be stored in the common cache, said cacheable object type having an associated context; and, upon said requested object having an object type which is specified among said enumerated set of cacheable object types, computing a cache key for said requested object using cache key formulation rules for said associated context, and retrieving said requested object from the common cache using said formulated cache key.

7. The machine readable storage of claim 6, wherein said computing step comprises the step of computing an individual cache key for said requested object using said cache key formulation rules for said associated context.

8. The machine readable storage of claim 7, wherein said computing step further comprises the step of computing a group cache key for said requested object using said cache key formulation rules for said associated context, said group key associating said requested object with other objects of said associated context which are stored in the common cache.

9. The machine readable storage of claim 6, further comprising the step of invalidating individual objects in the common cache according to conesponding cache policies of associated contexts.

10. The machine readable storage of claim 6, wherein said computing step comprises the steps of:

evaluating logical expressions in said formulations rules for said associated context, said evaluation producing a particular formulation rule; and, computing said cache key for said requested object using a cache key formulated using said particular formulation rule.

* * * * *